United States Patent
Humburg

(10) Patent No.: US 10,295,226 B2
(45) Date of Patent: May 21, 2019

(54) TEMPERATURE CONTROL UNIT, ESPECIALLY VEHICLE TEMPERATURE CONTROL UNIT

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 413 days.

(21) Appl. No.: 15/092,962

(22) Filed: Apr. 7, 2016

(65) Prior Publication Data
US 2016/0298881 A1    Oct. 13, 2016

(30) Foreign Application Priority Data
Apr. 9, 2015 (DE) .................. 10 2015 105 346

(51) Int. Cl.
*F25B 21/00* (2006.01)
*B60H 1/00* (2006.01)

(52) U.S. Cl.
CPC .......... *F25B 21/00* (2013.01); *B60H 1/00007* (2013.01); *F25B 2321/0022* (2013.01); *Y02B 30/66* (2013.01)

(58) Field of Classification Search
CPC ........ F25B 2321/0023; F25B 2321/002; F25B 2321/0021; F25B 2321/0022; F25B 21/00; Y02B 30/66; B60H 1/00007
See application file for complete search history.

(56) References Cited

U.S. PATENT DOCUMENTS

| | | | |
|---|---|---|---|
| 7,897,898 B2* | 3/2011 | Muller | F25B 21/00 219/672 |
| 9,377,221 B2* | 6/2016 | Benedict | F25B 21/00 |
| 9,625,185 B2* | 4/2017 | Benedict | F25B 21/00 |
| 2012/0266591 A1 | 10/2012 | Morimoto et al. | |
| 2013/0327062 A1 | 12/2013 | Watanabe et al. | |
| 2014/0165595 A1 | 6/2014 | Zimm et al. | |
| 2014/0366557 A1 | 12/2014 | Mun et al. | |
| 2015/0089960 A1 | 4/2015 | Takahashi et al. | |

FOREIGN PATENT DOCUMENTS

WO        2003/016794 A1    2/2003

* cited by examiner

*Primary Examiner* — Keith Raymond
*Assistant Examiner* — Kamran Tavakoldavani
(74) *Attorney, Agent, or Firm* — McGlew and Tuttle, P.C.

(57) ABSTRACT

A vehicle temperature control unit includes an annular temperature control body (12) of magnetocaloric material over and/or around which heat transfer medium flows and a magnetic field arrangement (24), rotatable about an axis of rotation (A), providing magnetic field heating areas (36) and cooling areas (38) between the heating areas (36). A plurality of heat transfer medium flow zones (40), following one another in the circumferential direction are provided with the temperature control body (12), include two heat transfer medium flow zones (40) adjacent to one another that are associated with a heat transfer medium circulation sector (S). Heat input fluid flows through and/or around at least one heat transfer medium flow zone (50) for feeding heat into this heat transfer medium flow zone (50), or/and heat discharge fluid flows through and/or around at least one heat transfer medium flow zone (52) for discharging heat from the flow zone (52).

20 Claims, 6 Drawing Sheets

TEMPERATURE CONTROL UNIT, ESPECIALLY VEHICLE TEMPERATURE CONTROL UNIT

CROSS REFERENCE TO RELATED APPLICATIONS

This application claims the benefit of priority under 35 U.S.C. § 119 of German Patent Application DE 10 2015 105 346.2 filed Apr. 9, 2015, the entire contents of which are incorporated herein by reference.

FIELD OF THE INVENTION

The present invention pertains to a temperature control unit, especially a vehicle temperature control unit, which can be used for cooling or heating, for example, a vehicle interior space by utilizing the magnetocaloric effect.

BACKGROUND OF THE INVENTION

Magnetocaloric material is alternately moved into a magnetic field and out of the magnetic field in heat pumps that operate by utilizing the magnetocaloric effect. A spin alignment of the electrons of the magnetocaloric material takes place under the influence of the magnetic field during the moving into the magnetic field. This spin alignment or alignment of the magnetic moments in the magnetic field results in the magnetic entropy decreasing. Because the overall entropy of the system cannot decrease, a thermal entropy manifesting itself in a rise in temperature is increased. The reverse process takes place if the magnetocaloric material is moved out of the magnetic field. The temperature of a magnetocaloric material moved out of a magnetic field decreases.

Because only minor differences in temperature can be brought about by utilizing the magnetocaloric effect compared to thermodynamic processes used in conventional cooling devices or heat pumps, it is necessary to carry out multistage processes, in which a successive temperature change is obtained by means of connecting in series a plurality of systems using the magnetocaloric effect, for providing a temperature change of the magnetocaloric material exceeding these temperature differences or of a fluid absorbing heat from said magnetocaloric material.

SUMMARY OF THE INVENTION

An object of the present invention is to provide a temperature control unit operating by utilizing the magnetocaloric effect, especially a vehicle temperature control unit, which can be operated with a simple and compact design for obtaining greater temperature changes.

This object is accomplished according to the present invention by means of a temperature control unit, especially a vehicle temperature control unit, comprising at least one preferably ring-shaped or annular temperature control body, which is made of magnetocaloric material and through which or/and around which heat transfer medium can flow, a magnetic field arrangement rotatable about an axis of rotation, the magnetic field arrangement providing magnetic field heating areas arranged following one another in the circumferential direction about the axis of rotation and cooling areas between the magnetic field heating areas, wherein a plurality of heat transfer medium flow zones following one another in the circumferential direction are provided with the temperature control body, and at least two heat transfer medium flow zones adjacent to one another in the circumferential direction provide a heat transfer medium circulation sector, and heat input fluid can flow through and/or around at least one heat transfer medium flow zone for feeding heat into this heat transfer medium flow zone, or/and heat discharge fluid can flow through and/or around at least one heat transfer medium flow zone for discharging heat from this heat transfer medium flow zone.

The temperature control unit according to the present invention may operate, in the manner of a heat pump, by utilizing the magnetocaloric effect in order to cool the heat input fluid, on the one hand, and to heat the heat discharge fluid, on the other hand, by means of thermal interaction. Thus, heat is transferred from the heat input fluid to the heat discharge fluid. Depending on whether the temperature control unit according to the present invention shall be used as a heating device or as a cooling device, the heat input fluid may be used in an associated heat exchanger arrangement in order to cool another medium, for example, the air to be introduced into a vehicle interior space, or the heat discharge fluid may be used, for example, to heat the air to be introduced into a vehicle interior space. Because the efficiency of the temperature control unit according to the present invention increases with increasing temperature, especially of the heat input fluid, the use as a cooling device, i.e., for example, as a vehicle air conditioner, is particularly advantageous.

Because an adaptation of the position of the heat transfer medium circulation sectors, which occurs in correspondence to the magnetic field motion, is necessary in the design according to the present invention due to the rotation of the magnetic field arrangement, it is suggested that at least one heat transfer medium flow zone provide a heat transfer medium circulation sector together with a heat transfer medium flow zone following this heat transfer medium flow zone in a direction of rotation of the magnetic field arrangement during a first phase of operation and provide a heat transfer medium circulation sector together with a heat transfer medium flow zone preceding this heat transfer medium flow zone in the direction of rotation of the magnetic field arrangement during a second phase of operation.

In order to be able to also factor the heat transfer medium flow zones through which heat discharge fluid and heat input fluid can flow into this position adaptation of heat transfer medium circulation sectors, it is suggested that in a type of phases of operation involving a first phase of operation and a second phase of operation, heat discharge fluid can flow through the at least one heat transfer medium flow zone through which heat discharge fluid can flow and heat input fluid can flow through the at least one heat transfer medium flow zone through which heat input fluid can flow, and that in the other type of phases of operation involving a first phase of operation and a second phase of operation, the heat transfer medium flow zone through which heat discharge fluid can flow together with a heat transfer medium flow zone adjacent to this zone provides a heat transfer medium circulation sector and the heat transfer medium flow zone through which heat input fluid can flow together with a heat transfer medium flow zone adjacent to this zone provides a heat transfer medium circulation sector. This means that in the design according to the present invention, heat input fluid can actually flow through the heat transfer medium flow zone through which heat input fluid can flow only in phases, while heat input fluid cannot flow through in phases, in which it is utilized for providing a heat transfer medium circulation sector. The same also applies to the heat transfer medium flow zone through which heat discharge fluid can flow.

In order to be able to attain a plurality of such switching processes and thus a multistage temperature control operation during the rotation of the magnetic field arrangement, it is suggested that first phases of operation and second phases of operation alternate with each other.

To obtain a switching between the two types of phases of operation which is synchronous with the motion of the magnetic field arrangement, it is suggested that the number of first phases of operation or/and second phases of operation occurring during a full rotation of the magnetic field arrangement be equal to the number of magnetic field heating areas of the magnetic field arrangement.

In order to create the possibility of bringing about a successive temperature change in heat transfer medium circulation sectors in a simple way in the temperature control unit according to the present invention, it is suggested that a circulation of heat transfer medium be provided in at least one heat transfer medium circulation sector, heat transfer medium being removed from one of the heat transfer medium flow zones of this heat transfer medium circulation sector and being fed into the other heat transfer medium flow zone of this heat transfer medium circulation sector and heat transfer medium being removed from the other heat transfer medium flow zone and being fed into the one heat transfer medium flow zone during the circulation.

In order to be able to attain a compact design considering the fact that the magnetic field arrangement rotates about an axis of rotation, it is suggested that the heat transfer medium be removed from the one heat transfer medium flow zone on a radial side or axial side of the temperature control body, preferably radially outwards, and be fed into the other heat transfer medium flow zone on the same radial side or axial side, preferably radially outwards, and be removed from the other heat transfer medium flow zone on the other radial side or axial side, preferably radially inwards and be fed into the one heat transfer medium flow zone on the same radial side or axial side, preferably radially inwards. In particular, provisions may be made for at least one heat transfer medium line to lead preferably radially outwards from the one heat transfer medium flow zone to the other heat transfer medium flow zone and for at least one heat transfer medium line to lead preferably radially inwards from the other heat transfer medium flow zone to the one heat transfer medium flow zone in at least one heat transfer medium circulation sector.

For making possible an adjustment of the position of the heat transfer medium circulation sectors to the position of the magnetic field of the magnetic field arrangement, it is suggested that in at least one heat transfer medium flow zone, a line section of a heat transfer medium line leading from or to this zone be able to be connected to a line section of a heat transfer medium line leading from or to a heat transfer medium flow zone following this heat transfer medium flow zone in the direction of rotation of the magnetic field arrangement or be able to be connected to a line section of a heat transfer medium line leading from or to a heat transfer medium flow zone preceding this heat transfer medium flow zone in the direction of rotation of the magnetic field arrangement. In particular, provisions may be made in this connection for the line section of a heat transfer medium line leading from or to the at least one heat transfer medium flow zone to be connected to the line section of a heat transfer medium line leading from or to the heat transfer medium flow zone following this heat transfer medium flow zone in the direction of rotation of the magnetic field arrangement during a first phase of operation and to be connected to the line section of a heat transfer medium line leading from or to the heat transfer medium flow zone preceding this heat transfer medium flow zone in the direction of rotation of the magnetic field arrangement during a second phase of operation.

A switchability between these various flow states or flow connections can be attained, for example, by the line sections being able to be connected by means of a switchable valve.

In order to be able to build up the circulation needed for the change in temperature in the heat transfer medium circulation sectors, it is suggested that a heat transfer medium pump be associated with at least one, preferably with each, heat transfer medium circulation sector.

The number of the heat transfer medium pumps to be used for providing the various heat transfer medium circulation sectors can be kept low according to an advantageous aspect of the present invention by a heat transfer medium pump being provided in association with every other of the heat transfer medium flow zones following one another in the circumferential direction such that these heat transfer medium flow zones together with the heat transfer medium flow zones following these zones in the direction of rotation of the magnetic field arrangement provide each a heat transfer medium circulation sector in a first phase of operation and together with the heat transfer medium flow zones preceding these [zones] in the direction of rotation of the magnetic field arrangement provide each a heat transfer medium circulation sector in a second phase of operation.

A plurality of heat transfer medium circulation sectors following one another in the circumferential direction may be provided in the temperature control unit according to the present invention so that a stepwise change in temperature from sector to sector can be achieved.

In order to be able to provide the necessary thermal interaction with the surrounding area in this case, it is suggested that a heat transfer medium flow zone through which or/and around which heat input fluid can flow and a heat transfer medium flow zone through which or/and around which heat discharge fluid can flow be arranged between two heat transfer medium circulation sectors following one another in the circumferential direction.

In order to avoid leaks of the heat transfer medium, which is generally a liquid, it is suggested that the temperature control unit be accommodated in a temperature control body housing.

In an embodiment that is structurally simple to achieve, it is suggested, for generating the magnetic fields needed for obtaining the magnetocaloric effect, that the magnetic field arrangement comprise a plurality of magnets, and preferably permanent magnets, which are arranged spaced apart from one another following one another in the circumferential direction and essentially provide the magnetic field heating areas, on at least one axial end face or at least one radial side of the temperature control body, the cooling areas being provided between the magnets arranged spaced apart from one another in the circumferential direction. In this connection, for example, magnets following one another in the circumferential direction can be carried on a magnet carrier ring which can be driven for rotation about the axis of rotation.

In a particularly advantageous variant, it is suggested that a plurality of magnets following one another in the circumferential direction about the axis of rotation and spaced apart from one another be provided on both axial end faces of the temperature control body, one magnet on the other end face being axially located opposite at least one, preferably each, magnet on one end face.

In order to increase the temperature control efficiency of the temperature control unit according to the present invention, it is suggested that at least two temperature control bodies arranged following one another be provided in the direction of the axis of rotation, a magnetic field arrangement preferably being associated with each temperature control body.

The present invention is described in detail below with reference to the attached figures. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
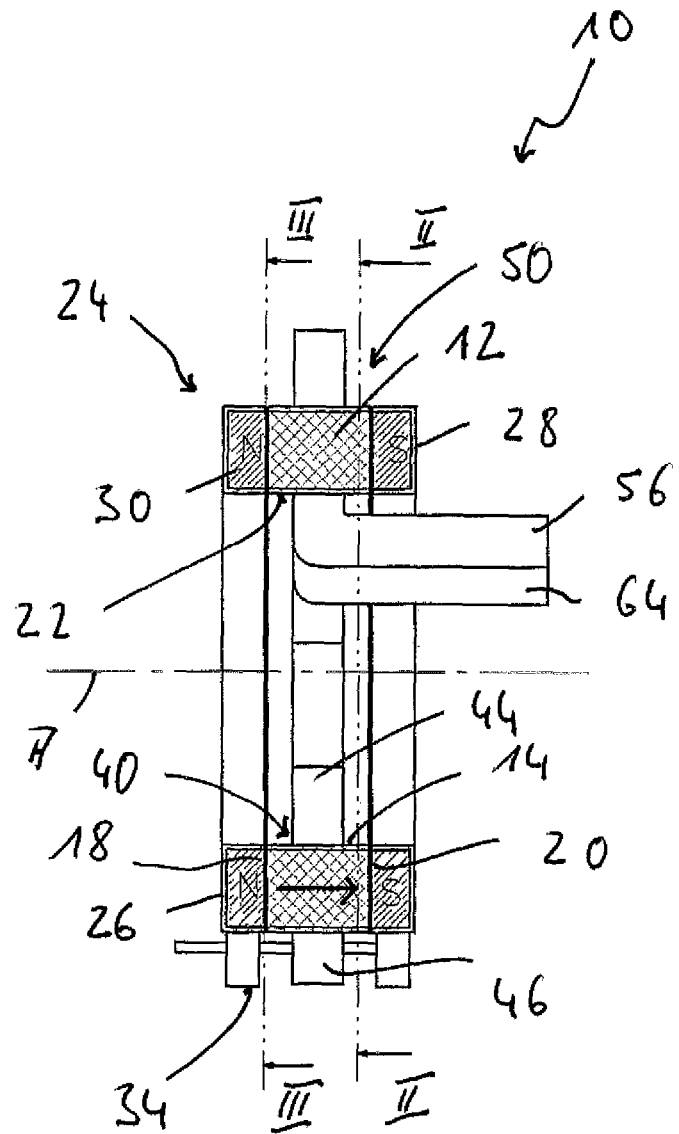
FIG. 1 is a longitudinal sectional view of a temperature control unit according to the invention using the magnetocaloric effect.

Referring to the drawings, a temperature control unit using the magnetocaloric effect is generally designated by 10 in FIG. 1. The temperature control unit 10 comprises a temperature control body 12 with a ring-shaped design or annular configuration and being made of magnetocaloric material. The temperature control body 12 extending in a ring-like manner about an axis of rotation A is enclosed by a temperature control body housing 22 encapsulating this temperature control body 12 on a radial inner side 14, on a radial outer side 16 and on two axial end faces 18, 20. The temperature control body 12 is thus received in the essentially completely closed interior space of the temperature control body housing 22.

The temperature control body 12, made of magnetocaloric material, is porous and flow through it is possible, i.e., for example, the temperature control body 12 is constructed with flow ducts such that heat transfer medium, generally a liquid, can flow around or through it for discharging heat or for feeding heat.

Figure 3:
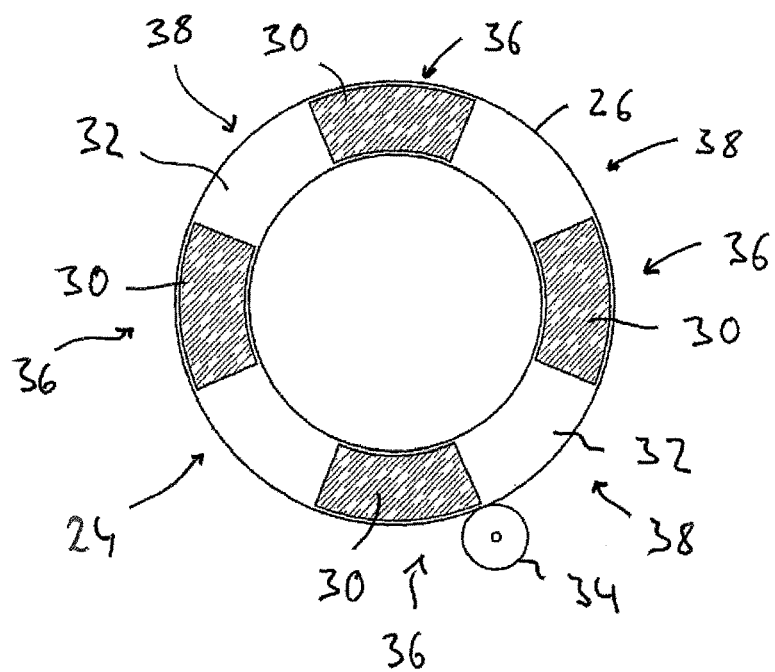
FIG. 3 is a sectional view of the temperature control unit of FIG. 1, cut along a line III-III in FIG. 1.

A magnetic field arrangement generally designated by 24 comprises a magnet carrier ring 26 or 28 axially on both sides of the temperature control body 12 or each on one of the sides of the temperature control body housing 22. As FIG. 3 shows this in an exemplary manner on the basis of the magnet carrier ring 26, a plurality of magnets, preferably permanent magnets 30, are carried on the magnet carrier rings 26, 28 following one another in the circumferential direction and are arranged at a circumferential distance to one another. The dimensioning and positioning of the magnets 30 is preferably such that a circumferential extension of the magnets 30 is essentially identical to an opposite circumferential distance (an opposite circumferential extension). In the example being shown, each magnet 30, and each gap 32 between such magnets 30, extends over an angle range of 45°.

The two magnet carrier rings 26, 28 are arranged such that the magnets 30 carried on them are each located opposite each other axially and preferably entirely overlap each other in the circumferential direction. In this connection, the positioning is such that a magnetic south pole of a magnet 30 on the magnet carrier ring 28 is located opposite a magnetic north pole of a magnet 30 on the magnet carrier ring 26 such that a magnetic field M, passing through the temperature control body 12 positioned in the same radial area there and extending essentially in a straight line from left to right in the view of FIG. 1, is generated between two such magnets 30, located opposite one another in pairs, of the two magnet carrier rings 26, 28.

The two magnet carrier rings 26, 28, which are, for example, rigidly connected to one another or are rotatable together about the axis of rotation A in relation to the stationary temperature control body housing 22, can be driven by a common drive, for example, electric motor drive 34 for rotating about the axis of rotation A.

In the example being shown, a total of four magnetic field heating areas 36 are provided with the four magnets 30 of the two magnet carrier rings 26, 28 arranged located opposite each other. The gaps 32 formed between the magnets 30 form corresponding cooling areas 38.

Figure 2:
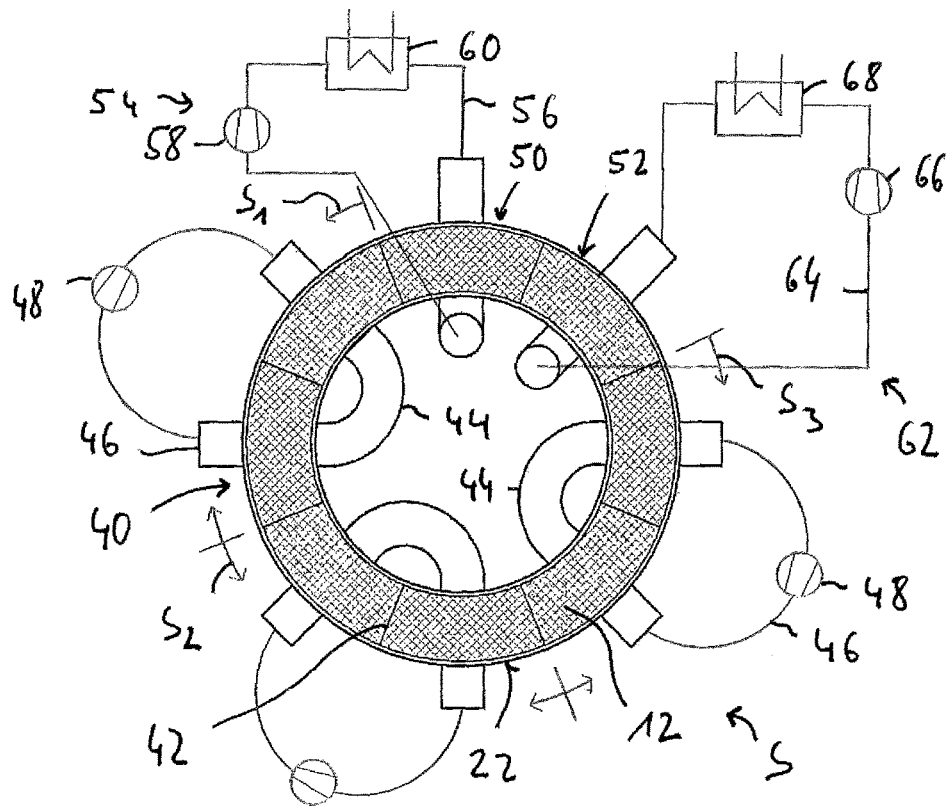
FIG. 2 is a sectional view of the temperature control unit of FIG. 1, cut along a line II-II in FIG. 1.

In the example being shown, a total of eight heat transfer medium flow zones (circulation heat transfer medium flow zones) 40 are formed at the temperature control body housing 22 or the temperature control body 12. As FIG. 2 shows this, the heat transfer medium flow zones 40 may be separated from one another in the circumferential direction by partitions 42 such that a defined fluid flow separation is provided between directly adjacent heat transfer medium flow zones 40. This means that in such an embodiment, the temperature control body 12 with a ring-shaped design is equally made of a plurality of segments provided in corresponding heat transfer medium flow zones 40. In an alternative variant, the temperature control body 12 can be provided as a continuous ring closed in itself, and the various heat transfer medium flow zones 40 are not separated from one another from a flow-related point of view.

Two heat transfer medium flow zones 40 directly following one another in the circumferential direction provide each a heat transfer medium circulation sector S in phases of operation which shall still be described below. In the example that can be seen in FIG. 2, three such heat transfer medium circulation sectors $S_1$, $S_2$ and $S_3$ following one another in the circumferential direction are provided. In each heat transfer medium circulation sector S, the two heat transfer medium flow zones 40 providing this sector are connected to one another for flow by means of a heat transfer medium line 44 on the radial inner side and connected to one another by means of a heat transfer medium line 46 on the radial outer side. In this case, for example, the heat transfer medium line 44 in the area of the radial inner side 14 of the temperature control body housing 22 can discharge into this housing 22 or into the interior space thereof, while the heat transfer medium line 46 on the radial outer side 16 can discharge into the temperature control body housing 22 or the interior space thereof. In order to build up a heat transfer medium circulation between the two heat transfer medium flow zones of a corresponding heat transfer medium circulation sector S, a pump 48 driving the heat transfer medium circulation is provided, for example, in each case in the radially outwards positioned heat transfer medium line 46. The heat transfer medium provided, for example, by water consequently flows through the heat transfer medium lines 44, 46 during the delivery operation of the corresponding pump 48 and the areas of the temperature control body 12 lying in the heat transfer medium flow zones 40 providing a corresponding heat transfer medium circulation sector S.

A heat transfer medium flow zone (heat transfer medium input flow zone) 52 through which heat input fluid can flow and a heat transfer medium flow zone (heat transfer medium discharge flow zone) 50 through which heat discharge fluid can flow next to this zone 52 lie between the two heat transfer medium circulation sectors $S_1$ and $S_3$ provided in the phase of operation shown in FIG. 2 or the two heat transfer medium flow zones 40 of these heat transfer medium circulation sectors $S_1$, $S_3$, which circulation zones 40 are spaced apart and follow one another in the circumferential direction. A heat discharge fluid circulation 54 with a heat transfer medium line 56, with a pump 58 and with a heat exchanger arrangement 60 is associated with the heat transfer medium flow zone 50. The heat transfer medium line 56 connects to the temperature control body housing 22, for example, on the radial inner side 14 and on the radial outer side 16. The heat discharge fluid flows through the heat transfer medium line 56 and thus the area of the temperature control body 12 lying in the area of the heat transfer medium flow zone 50 during the operation of the pump 58. In this case, the heat discharge fluid can absorb heat from the temperature control body 12 and transmit this heat, for example, to the ambient air in the area of the heat exchanger arrangement 60.

A heat transfer medium circulation 62 is associated with the heat transfer medium flow zone 52. This circulation 62 comprises a heat transfer medium line 64, a pump 66 and a heat exchanger arrangement 68. The heat transfer medium line 64 discharges, for example, on the radial inner side 14 and on the radial outer side 16 in the area of the heat transfer medium flow zone 52 into the temperature control body housing 22. The heat input fluid flows through the heat exchanger arrangement 68 during the delivery operation of the pump 66 and can consequently absorb heat from the surrounding area. The heat input fluid flows, in this heated state, to the heat transfer medium flow zone 52 and there transmits heat to the part of the temperature control body 12 positioned in the area of the heat transfer medium flow zone 52. The heat input fluid then flows, in a cooled state, via the pump 66 back to the heat exchanger arrangement 68.

The interaction of the magnetic field M provided by the magnet array—magnetic field arrangement 24—in the magnetic field heating areas 36 with the magnetocaloric material of the temperature control body 12 leads in this material to a spin alignment of the electrons, i.e., of the magnetic moments in the magnetocaloric material and thus to a heating of the temperature control body 12 in those areas that are in the magnetic field heating areas 36 of the magnetic field arrangement 24 or are moved into these areas. The spin alignment is lost and the magnetocaloric material is cooled in those areas that are outside of the magnetic field heating areas 36, i.e., in the cooling areas 38 or are moved into these areas. Due to the alternating moving into the magnetic field heating area 36 and moving out of the magnetic field heating areas 36, an adiabatic heating or adiabatic cooling is generated because of the rotation of the magnet array—magnetic field arrangement 24—about the axis of rotation A, which leads to a corresponding series connection of a plurality of cycles in the temperature control unit 10 due to the series connection of a plurality of heat transfer medium circulation sectors. A heat transfer medium flow area (zone) 40 of a heat transfer medium circulation sector S as well as the directly adjacent heat transfer medium flow zone 40 of a directly adjacent heat transfer medium circulation sector S are each associated with such a cycle. The heat transfer medium flow zone 50 through which heat discharge fluid can flow and the heat transfer medium flow zone 40 of the heat transfer medium circulation sector $S_1$ following it, for example, in a counterclockwise direction in FIG. 2 form such a stage of a cycle as well. The heat transfer medium flow zone 52 through which heat input fluid can flow and the heat transfer medium flow zone 40 of the heat transfer medium circulation sector $S_3$ following it in a clockwise direction in FIG. 2 likewise form a stage of such a cycle.

Figure 4:
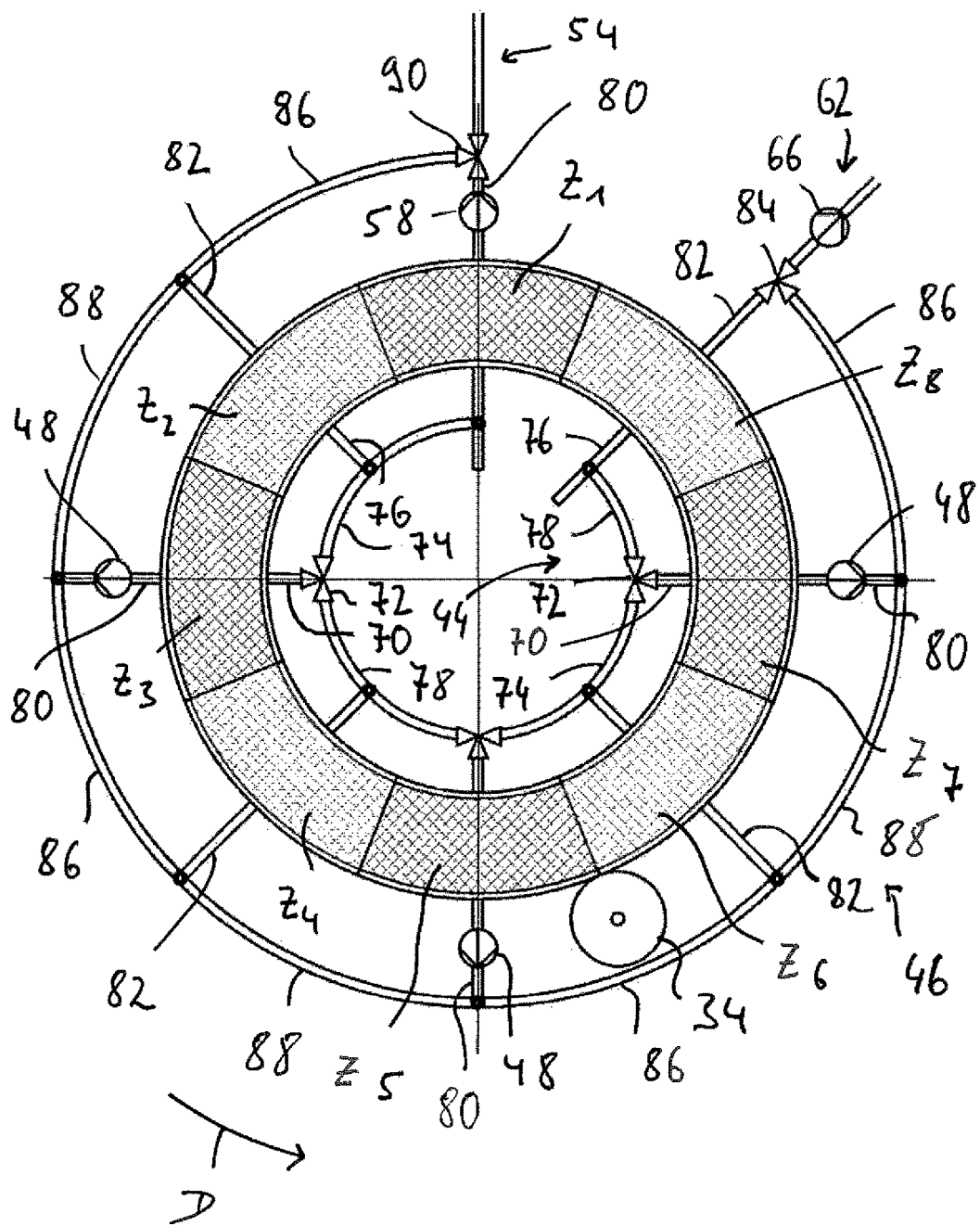
FIG. 4 is a schematic diagram for illustrating the heat transfer medium lines provided for providing position-variable heat transfer medium circulation sectors.

FIG. 4 shows in greater detail the flow diagram composed of a total of eight heat transfer medium flow zones 40, 50, 52 in the example shown and the heat transfer medium lines used for them. The heat transfer medium flow zones 40, 50, 52 are numbered consecutively as zones $Z_1$ through $Z_8$ for the following description. In this connection, the zone $Z_1$ corresponds to the (discharge) heat transfer medium flow zone 50, through which the heat discharge fluid can flow during a first phase of operation which shall still be explained below. The zone $Z_8$ corresponds to the (input) heat transfer medium flow zone 52, through which the heat input fluid can flow during the first phase of operation.

As can be seen, for example, based on the zone $Z_7$, the heat transfer medium line 44 connecting this zone $Z_7$ on the radial inner side to the zone $Z_6$ comprises a line section 70 leading away from the zone $Z_7$. The line section 70 leads to a switchable valve 72, for example, a 3/2-way valve. A line section 74 leads from the valve 72 to a line section 76. The line section 76 discharges radially inwards into the zone $Z_6$ and is in connection with this zone. On the radial inner side, a line section 70 leading to a valve 72 and a line section 76 not leading to a valve 72 each alternately lead away from the zones $Z_1$ through $Z_8$ following one another in the circumferential direction. On the one hand, the line sections 76 are in connection with a line section 74 leading to a valve 72 in the direction of rotation D of the magnet array—magnetic field arrangement 24—as well as with a line section 78 leading to a valve 72 preceding in the direction of rotation D. Each line section 70 forms a heat transfer medium line 44 together with the valve 72 associated with this section, with the line section 78 following in the direction of rotation and with the line section 76 following in the direction of rotation D, but likewise forms a heat transfer medium line 44 with the line section 74 preceding in the direction of rotation D and with the line section 76 preceding in the direction of rotation, in each case depending on the phase of operation, in which the temperature control unit 10 is.

The heat transfer medium line or each heat transfer medium line provided on the radial outer side is composed of a plurality of line sections as well. As can be seen again based on the example of the zone $Z_7$, a line section 80, in which a pump 48 is integrated, leads radially outwards away from this zone $Z_7$. Following the line section 80 in the direction of rotation D, a line section 82 in association with the zone $Z_8$ is provided, which line section leads away from this zone radially outwards, and consequently to a valve 84, for example, a 3/2-way valve. A line section 86 extends to the valve 84 between the line section 80 leading radially outwards away from the zone $Z_7$ and the line section 82. A line section 82 in association with the zone $Z_6$ is provided preceding the line section 80 of the zone $Z_7$ in the direction of rotation D. A line section 88 leads from the line section 80 of the zone $Z_7$ to the line section 82 of the zone $Z_6$. Thus, a heat transfer medium line 46 is provided in each case by a line section 80, a line section 82 as well as a line section 86 or a line section 88 following one another in the circumferential direction. It should also be emphasized here that a pump 48 or in the case of the zone $Z_1$ the pump 58 of the heat transfer medium circulation 54 is provided in each line section 80, i.e., in association with every other of the zones $Z_1$ through $Z_8$. It should further be pointed out that a valve 90, for example, a 3/2-way valve, into which a line section 86 also discharges, is provided in association with the line section 80, which leads away from the zone $Z_1$.

Two different phases of operation alternately following one another, which are described below with reference to FIGS. 5 and 6, can be set up by switching the valves 72, 82 and 90.

First, the flow of the heat transfer medium during a first phase of operation will be explained with reference to FIG. 5. In this first phase of operation, the two valves 84 and 90 are set such that they block the line sections 86 leading to these valves 84 and release the heat transfer medium circulations 54 and 62 so that the heat discharge fluid circulates through the zone $Z_1$ in the heat transfer medium circulation 54 and the heat input fluid circulates through the zone $Z_8$ in the heat transfer medium circulation 62. The valve 72 associated with the zone $Z_3$ is switched such that it connects the line section 70 associated with the zone $Z_3$ to the line section 74 leading from the zone $Z_2$, while the line section 78 leading to the zone $Z_4$ is closed. The first heat transfer medium circulation sector $S_1$ is thus set up with the line sections 76, 74, 72, 80, 88, 82 associated with the two zones $Z_2$ and $Z_3$. In a corresponding manner, the heat transfer medium circulation sector $S_2$ is set up by the two zones $Z_4$ and $Z_5$ and the heat transfer medium circulation sector $S_3$ is set up by the zones $Z_6$ and $Z_7$. The two heat transfer medium flow zones 50, 52, i.e., the zones $Z_1$, $Z_8$, through which the heat discharge fluid or the heat input fluid can circulate in this first phase of operation, lie between the zones $Z_2$ of the heat transfer medium circulation sector $S_1$ and $Z_7$ of the heat transfer medium circulation sector $S_3$.

This first phase of operation is set up by corresponding actuation of the valves 72, 84, 90 essentially during a time phase, during which the magnets 30 of the magnet array are in the area of the zones $Z_1$, $Z_3$, $Z_5$ and $Z_7$. By moving the magnets 30 in the area of these zones, these are adiabatically heated because of the magnetocaloric effect. Due to the heat transfer medium flowing through each of these zones $Z_1$, $Z_3$, $Z_5$ and $Z_7$, heat is absorbed and transported into the zones $Z_2$, $Z_4$, $Z_6$. Likewise, heat is discharged in the area of the zone $Z_1$, while heat is fed in the area of the zone $Z_8$. As the magnets 30 are moved during the rotation of the magnet array 24 in the direction of rotation D further into the area of the zones $Z_2$, $Z_4$, $Z_6$ and $Z_8$, the valves 72, 84, 90 are switched such that the switching state of the second phase of operation, which can be seen in FIG. 6, is reached. Now, the first heat transfer medium circulation sector $S_1'$ is set up with the line sections 76, 78, 70, 80, 86, 88 of the zones $Z_1$, $Z_2$, for which the valve 90 is switched such that it establishes a connection between the line section 80 also containing the pump 58 and the line section 86, but breaks the further connection to the heat transfer medium circulation 54. In this second phase of operation, the pump of the heat transfer medium circulation 54 is consequently effective as a pump of the heat transfer medium circulation sector $S_1'$. Likewise, the heat transfer medium circulation sector $S_2$ is set up by the zones $Z_3$ and $Z_4$ and the heat transfer medium circulation sector $S_3$ is set up by the zones $Z_5$, $Z_6$. The valve 84 provided in the heat transfer medium circulation is set such that it connects the line section 82 to the line section 86, but breaks the flow connection to the further heat transfer medium circulation 62. A fourth heat transfer medium circulation sector $S_4'$ is thus set up by the zones $Z_7$ and $Z_8$ in this second phase of operation.

Because the zones $Z_2$, $Z_4$, $Z_6$ and $Z_8$ are in the area of the magnets 30 providing the magnetic field heating areas 36 of the magnet array 34 in this second phase of operation, these zones or the magnetocaloric material of the temperature control body 12 present in these zones are now heated adiabatically. The heat transfer medium circulating in the different heat transfer medium circulation sectors $S_1'$, $S_2'$, $S_3'$ and $S_4'$ transports heat from these zones $Z_2$, $Z_4$, $Z_6$ and $Z_8$ into the cooling areas, each following in the circumferential direction, between the magnets 30, i.e., essentially those areas, in which the zones $Z_1$, $Z_3$, $Z_5$ and $Z_7$ are in the second phase of operation.

Figure 5:
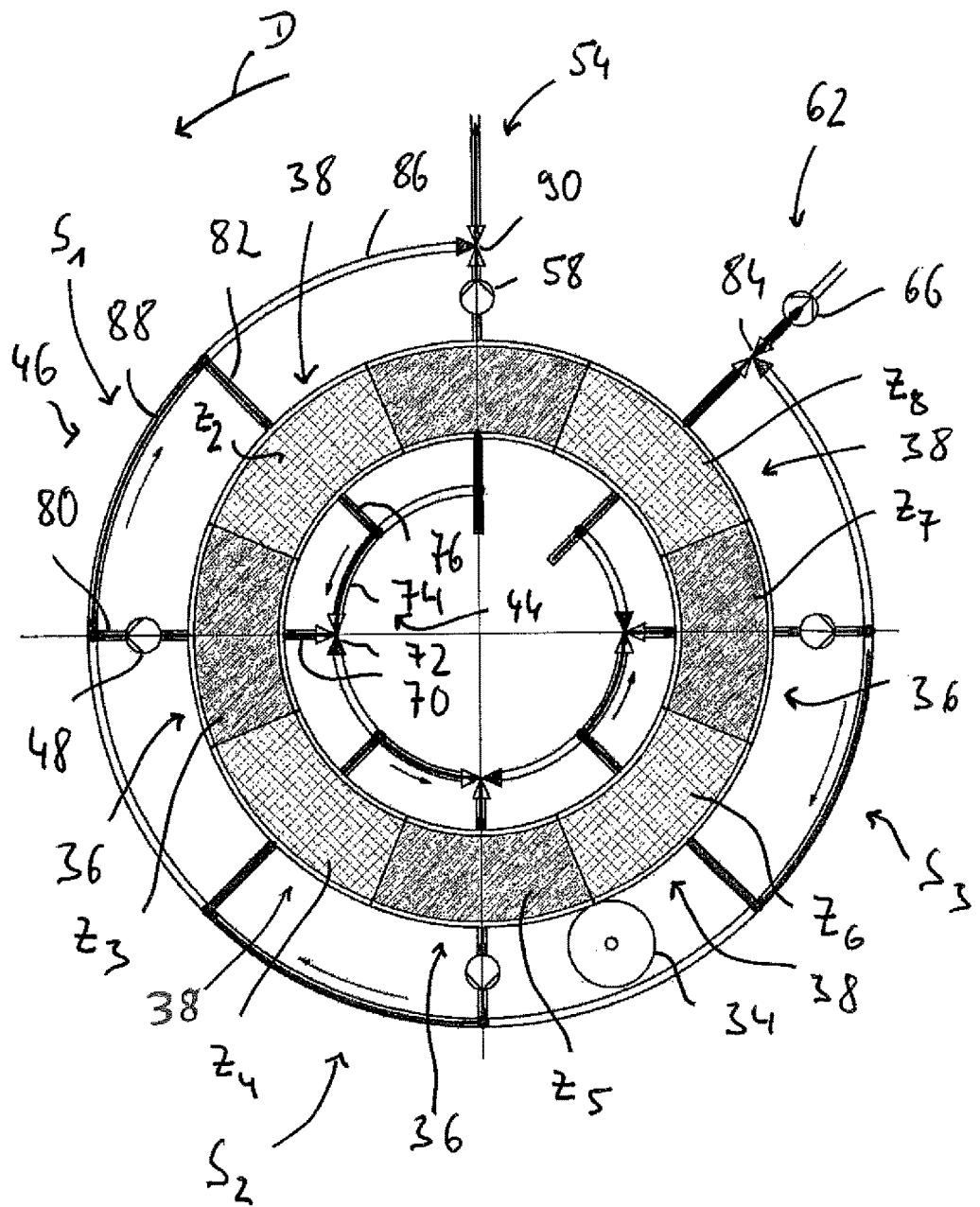
FIG. 5 is a view of the temperature control unit corresponding to FIG. 4 during a first phase of operation.
Figure 6:
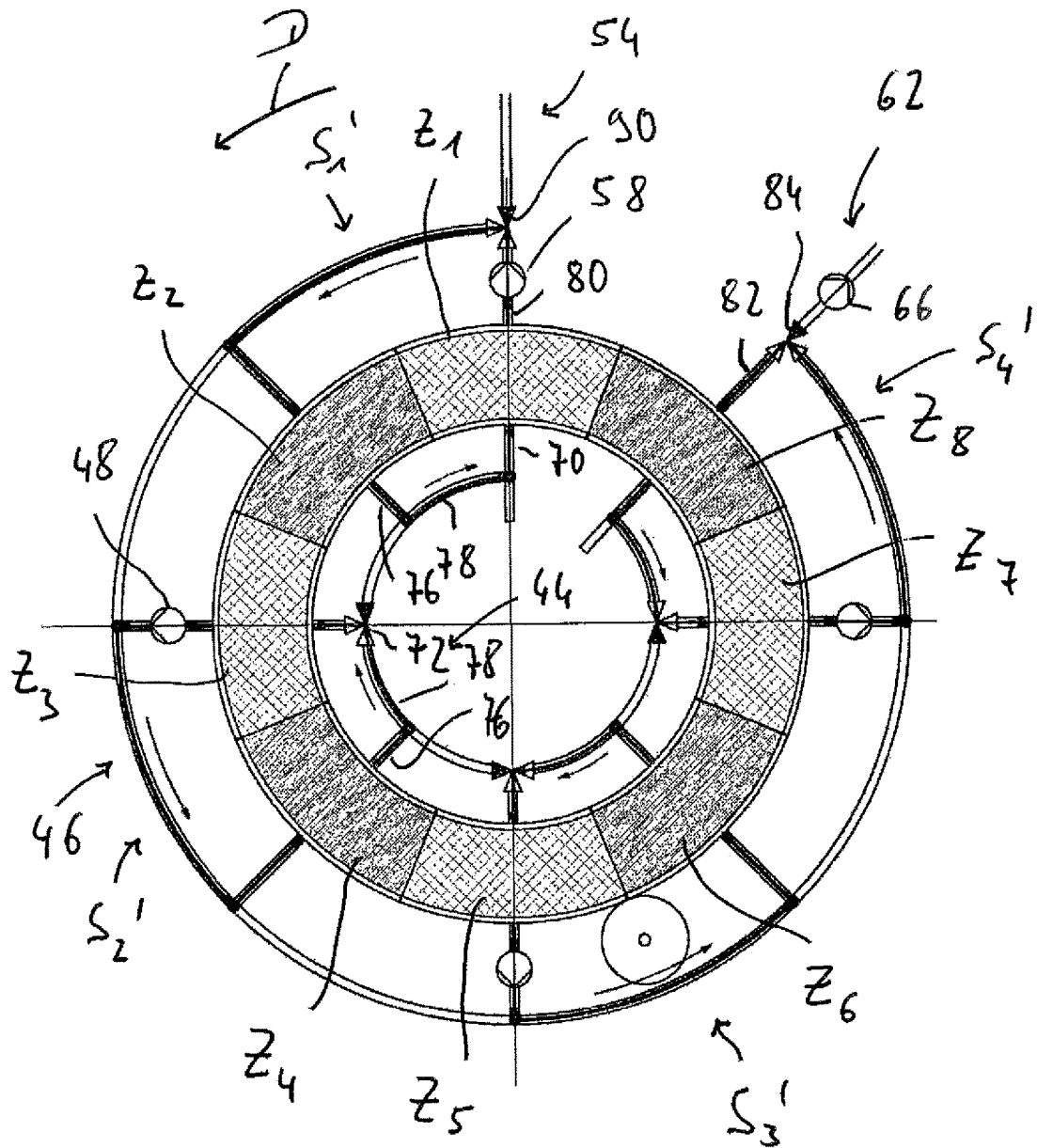
FIG. 6 is a view of the temperature control unit corresponding to FIG. 4 during a second phase of operation.

For example, based on the heat transfer medium flow zone 40 designated as zone $Z_4$, it is seen that this zone $Z_4$ together with the zone $Z_5$ following in the direction of rotation D provide a heat transfer flow sector $S_2$ during the first phase of operation shown in FIG. 5, while this zone $Z_4$ together with the zone $Z_3$ preceding in the direction of rotation D of this zone $Z_4$ provides the heat transfer circulation sector $S_2'$ after further rotation of the magnet array 24 by about 45° during the second phase of operation. This essentially applies to all zones $Z_1$ through $Z_8$. Only the zones $Z_1$ and $Z_8$ are only effective as heat transfer medium flow zones of a corresponding heat transfer circulation sector $S_1'$ or $S_4'$ in the second phase of operation shown in FIG. 6. These two heat transfer medium flow zones 50 and 52 are components of the heat transfer medium circulations 54 and 62 in the first phase of operation.

Due to the above-described alternating switching between the two phases of operation, it is achieved that the heat transfer medium circulation sectors are set up to be adapted to the rotary motion or the rotary positioning of the magnetic field arrangement 24 such that a defined association of heat transfer medium circulation sectors with the positioning of the magnetic field heating areas 36 provided by the magnets 30 or with the cooling areas 38 formed between them is achieved or retained in spite of the rotation of the magnetic field arrangement 24. A stage-like series connection of a plurality of magnetocaloric cycles can thus also be achieved and thus a successive heating or cooling can be achieved during the rotation of the magnetic field arrangement 24.

In order to make possible a sufficient thermal interaction of the heat transfer medium flowing through the corresponding heat transfer medium flow zones 40 with the magnetocaloric material of the temperature control body 12 present therein during the rotation of the magnetic field arrangement 24, the rotation operation of the magnetic field arrangement 24 can take place intermittently or with variable speed of rotation. It can thus be guaranteed that whenever a magnetic field heating area 36 or a cooling area 38 is essentially fully aligned with a heat transfer medium flow zone 40 in the circumferential direction, the heat transfer medium can remove heat from the part of the temperature control body 12 positioned in such a state in a magnetic field heating area 36 or correspondingly can feed heat into the cooling areas in the temperature control body 12 by means of temporarily lowering the speed of rotation of the magnetic field arrangement 24 or by means of temporarily stopping the magnetic field arrangement 24. Between such phases of heat exchange with lower speed of rotation or non-rotating magnetic field arrangement 24, the magnetic field heating areas 36 and the cooling areas 38 continue to move in phases of motion in the direction of rotation D until they are essentially fully aligned with the heat transfer medium flow zones 40 following in the direction of rotation D. In the course of these phases of motion, the valves 72, 84, 90 may then also be switched in order to achieve a corresponding adaptation of the heat transfer medium circulation sectors S to the rotary position of the magnetic field arrangement 24.

Due to the series connection of a plurality of such stages, in which two directly adjacent stages are each connected by the heat transfer medium lines 44, 46 associated with a heat transfer medium circulation, a stage-like heating can thus be generated in the series-connected cycle stages during the rotation operation of the magnetic field arrangement 24 due to the consequently occurring alternating moving in and moving out of areas of the temperature control body 12 into the magnetic field M or out of the magnetic field M. In this connection, heat from the area of the heat transfer medium flow zone 52 is transported during the multistage cycle via the heat transfer medium circulation sectors S to the heat transfer medium flow zone 50. Ultimately, the result of this is that the heat transfer medium circulating in the heat transfer medium circulation 62, i.e., for example, water, is cooled when flowing through the temperature control body 12 and the heat consequently absorbed in the temperature control body 12 is used to heat the heat transfer medium, for example, also water, circulating in the heat transfer medium circulation 54 in the area of the heat transfer medium flow zone 50.

Like an air conditioner, the heat exchanger arrangement 68 can consequently cool the air to be fed into a vehicle interior space. As an alternative, it is possible to heat the air to be fed into the vehicle interior space in the area of the heat exchanger arrangement 60 such that the temperature control unit 10 in this case can operate like a heater. Because the above-described cycle with increasing ambient temperature, i.e., with increasing temperature especially of the heat transfer medium circulating in the heat transfer medium circulation 54 is more efficient, the operation for air conditioning can be carried out in an especially advantageous and efficient manner.

Figure 7:
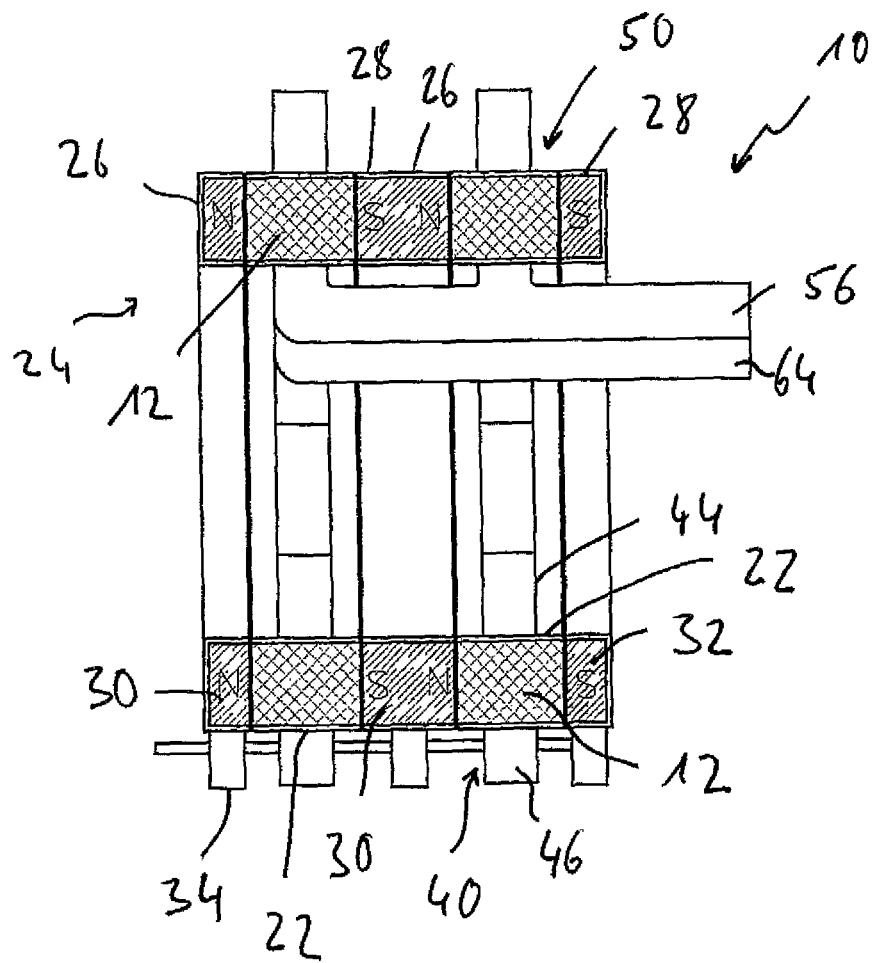
FIG. 7 is a view of an alternative embodiment of a temperature control unit corresponding to FIG. 1.

In the variant shown in FIG. 7, two temperature control bodies following each other in the direction of the axis of rotation A are received in temperature control body housings 22 associated with each of them. Likewise, a magnetic field arrangement 24 is associated with each temperature control body 12, the magnet carrier rings 26, 28 comprising this [arrangement] in each case. In this connection, the magnet carrier rings 28, 26 of the two magnetic field arrangements 24 positioned between the two temperature control bodies 12 can be combined into a common magnet carrier ring and can be driven together for rotation.

Heat transfer medium can flow through the two temperature control bodies 12 and the temperature control body housings 22 in the manner described above, wherein a flow-related parallel connection is provided in the example shown in FIG. 4. It can thus be ensured that the heat transfer medium flowing in a corresponding circulation interacts thermally with the corresponding temperature control body 12 in the same manner and to the same extent in both parallel-connected temperature control bodies 12.

It should be pointed out here that more than two temperature control bodies with respective magnetic field arrangements may also, of course, be arranged or coupled following one another axially or, in principle, in parallel connection with one another to increase the temperature control efficiency even further.

Further, it should be pointed out that the magnet carrier rings could also be arranged radially within and radially outside of the temperature control body in the above-described embodiment, while heat transfer medium can flow axially through the temperature control body housing and the temperature control body each, i.e., the corresponding heat transfer medium line at the end faces 18, 20 discharges into the heat transfer housing 22. The arrangement may be, in principle, such that the direction of the magnetic field M of the magnetic field arrangement is essentially at right angles to a main flow direction of the heat transfer medium in the temperature control body.

Further, it should be pointed out that a different number of heat transfer medium circulation sectors and thus a correspondingly different number of consecutive stages of the magnetocaloric cycle can also be achieved by a different division of the magnetic field heating areas and of the cooling areas and a corresponding number of heat transfer medium flow zones. For example, a five-stage cycle can be achieved in case of an angular extension of the magnetic field heating areas or of the cooling areas over 36° in each case, i.e., with corresponding set-up of ten heat transfer medium flow zones.

While specific embodiments of the invention have been shown and described in detail to illustrate the application of the principles of the invention, it will be understood that the invention may be embodied otherwise without departing from such principles.

What is claimed is:

1. A temperature control unit comprising:
   at least one annular temperature control body made of magnetocaloric material and through which or around which or both through and around which heat transfer medium flows;
   a magnetic field arrangement rotatable about an axis of rotation, the magnetic field arrangement providing a plurality of magnetic field heating areas arranged following one another in a circumferential direction about the axis of rotation and a plurality of cooling areas between the magnetic field heating areas providing an alternating arrangement of magnetic field heating areas and cooling areas;
   a plurality of circulation heat transfer medium flow zones following one another in the circumferential direction and provided with the temperature control body, at least two of the plurality of circulation heat transfer medium flow zones being adjacent to one another in the circumferential direction to provide a heat transfer medium circulation sector, wherein a circulation of heat transfer medium is provided in the at least one heat transfer medium circulation sector, wherein during the circulation heat transfer medium is removed from one of the heat transfer medium flow zones associated with said at least one heat transfer medium circulation sector and fed into the another of the circulation heat transfer medium flow zones of said at least one heat transfer medium circulation sector and heat transfer medium is removed from the other circulation heat transfer medium flow zones and fed into the one circulation heat transfer medium flow zones; and at least one of an input heat transfer medium flow zone, through which heat input fluid can flow through or around or both through and around, for feeding heat into the input heat transfer medium flow zone, or a discharge heat transfer medium flow zone, through which heat discharge fluid can flow through or around or both through and around, for discharging heat from the discharge heat transfer medium flow zone or both an input heat transfer medium flow zone, through which heat input fluid can flow through or around or both through and around, for feeding heat into the input heat transfer medium flow zone and a discharge heat transfer medium flow zone, through which heat discharge fluid can flow through or around or both through and around, for discharging heat from the discharge heat transfer medium flow zone.

2. A temperature control unit in accordance with claim 1, wherein at least one of the circulation heat transfer medium flow zones provides a heat transfer medium circulation sector together with another of the circulation heat transfer medium flow zones following in a direction of rotation of the magnetic field arrangement during a first phase of operation and provides a heat transfer medium circulation sector together with another of the circulation heat transfer medium flow zones preceding in the direction of rotation of the magnetic field arrangement during a second phase of operation.

3. A temperature control unit in accordance with claim 2, wherein in one type of phases of operation involving the first phase of operation and the second phase of operation, heat discharge fluid flows through the at least one discharge heat transfer medium flow zone through which heat discharge fluid can flow and heat input fluid flows through the at least one input heat transfer medium flow zone through which heat input fluid can flow, and that in another type of phases of operation of the first phase of operation and the second phase of operation, the discharge heat transfer medium flow zone through which heat discharge fluid can flow together with one of the circulation heat transfer medium flow zones adjacent to said discharge heat transfer medium flow zone through which heat discharge fluid can flow provides a heat transfer medium circulation sector and the input heat transfer medium flow zone through which heat input fluid can flow together with one of the circulation heat transfer medium flow zones adjacent to said input heat transfer medium flow zone provides a heat transfer medium circulation sector.

4. A temperature control unit in accordance with claim 3, wherein first phases of operation and second phases of operation alternate with one another.

5. A temperature control unit in accordance with claim 3, wherein a number of first phases of operation or second phases of operation occurring during a full rotation of the magnetic field arrangement is equal to a number of the magnetic field heating areas of the magnetic field arrangement.

6. A temperature control unit in accordance with claim 1, wherein the heat transfer medium is removed from the one circulation heat transfer medium flow zones on a radial side or an axial side of the temperature control body outwards, and heat transfer medium is fed into the other circulation heat transfer medium flow zones on the same radial side or axial side outwards, and is removed from the other circulation heat transfer medium flow zones on the other radial side or axial side inwards and is fed into the one circulation heat transfer medium flow zones on the same radial side or axial side inwards.

7. A temperature control unit in accordance with claim 1, wherein in at least one of the heat transfer medium circulation sectors, at least one heat transfer medium line leads radially outwards from the one circulation heat transfer medium flow zones to the other circulation heat transfer medium flow zones and at least one heat transfer medium line leads radially inwards from the other circulation heat transfer medium flow zones to the one circulation heat transfer medium flow zones.

8. A temperature control unit in accordance with claim 1, wherein in at least one of the circulation heat transfer medium flow zones, a line section of a heat transfer medium line leading from or to said one of the circulation heat transfer medium flow zones is connectable to a line section of a heat transfer medium line leading from or to a following one of the circulation heat transfer medium flow zones, in the direction of rotation of the magnetic field arrangement or is connectable to a line section of a heat transfer medium line leading from or to a preceding one of the heat transfer medium flow zones in the direction of rotation of the magnetic field arrangement.

9. A temperature control unit in accordance with claim 8, wherein the line section of the heat transfer medium line leading from or to the at least one of the circulation heat transfer medium flow zones is connected to the line section of the heat transfer medium line leading from or to a following one of the circulation heat transfer medium flow zones in the direction of rotation of the magnetic field arrangement during a first phase of operation and is connected to the line section of the heat transfer medium line leading from or to a preceding one of the circulation heat transfer medium flow zones in the direction of rotation of the magnetic field arrangement during a second phase of operation.

10. A temperature control unit in accordance with claim 8, further comprising a valve connecting the line sections.

11. A temperature control unit in accordance with claim 1, further comprising a heat transfer medium pump associated with at least one of the heat transfer medium circulation sectors.

12. A temperature control unit in accordance with claim 2, further comprising a heat transfer medium pump associated with each of the heat transfer medium circulation sectors, wherein:

the circulation heat transfer medium flow zones, together with following circulation heat transfer medium flow zones—following in the direction of rotation of the magnetic field arrangement—provide one of the heat transfer medium circulation sectors in the first phase of operation and the circulation heat transfer medium flow zones, together with preceding circulation heat transfer medium flow zones—preceding in the direction of rotation of the magnetic field arrangement—provide one of the heat transfer medium circulation sectors in the second phase of operation.

13. A temperature control unit in accordance with claim 1, wherein a plurality of heat transfer medium circulation sectors follow one another in the circumferential direction.

14. A temperature control unit in accordance with claim 13, wherein the input heat transfer medium flow zone and the discharge heat transfer medium flow zone are arranged between two heat transfer medium circulation sectors provided following one another in the circumferential direction.

15. A temperature control unit in accordance with claim 1, further comprising a temperature control body housing wherein the temperature control body is received in the temperature control body housing.

16. A temperature control unit in accordance with claim 1, wherein the magnetic field arrangement is on at least one axial end face or at least one radial side of the temperature control body and comprises a plurality of magnets arranged spaced apart from one another and following one another in the circumferential direction and which provide the magnetic field heating areas, the cooling areas being provided between magnets arranged spaced apart from one another in the circumferential direction.

17. A temperature control unit in accordance with claim 16, wherein the magnets following one another in the circumferential direction are carried in a magnet carrier ring driveable for rotation about the axis of rotation.

18. A temperature control unit in accordance with claim 16, wherein the plurality of magnets following one another in the circumferential direction about the axis of rotation and arranged spaced apart from one another are provided each on both axial end faces of the temperature control body, with one magnet on the other end face located axially opposite at least one magnet on the one end face.

19. A temperature control unit in accordance with claim 1, further comprising another temperature control body to provide at least two temperature control bodies arranged following one another in the direction of the axis of rotation, a magnetic field arrangement is associated with each temperature control body.

20. A temperature control unit comprising:
  an annular temperature control body comprising magnetocaloric material and through which or around which or both through and around which heat transfer medium flows;
  a magnetic field arrangement rotatable about an axis of rotation, the magnetic field arrangement comprising a plurality of magnets, each of the plurality of magnets being located at a spaced location from another one of the plurality of magnets to define a plurality of gaps, each of the gaps defining a cooling area and each of the plurality of magnets defining a magnetic field heating area, wherein each cooling area is located adjacent to one magnetic field heating area and another magnetic field heating area in a circumferential direction about the axis of rotation to define an alternating arrangement of magnetic field heating areas and cooling areas;
  a plurality of circulation heat transfer medium flow zones following one another in the circumferential direction and provided with the temperature control body, at least two of the plurality of circulation heat transfer medium flow zones being adjacent to one another in the circumferential direction to provide at least one heat transfer medium circulation sector, wherein a heat transfer medium is at least transferred from one of the at least two of the circulation heat transfer medium flow zones of the at least one heat transfer medium circulation sector to another of one of the at least two of the plurality of circulation heat transfer medium flow zones of the at least one heat transfer medium circulation sector; and
  at least one of an input heat transfer medium flow zone, through which heat input fluid can flow through or around or both through and around, for feeding heat into the input heat transfer medium flow zone, or a discharge heat transfer medium flow zone, through which heat discharge fluid can flow through or around or both through and around, for discharging heat from the discharge heat transfer medium flow zone or both an input heat transfer medium flow zone, through which heat input fluid can flow through or around or both through and around, for feeding heat into the input heat transfer medium flow zone and a discharge heat transfer medium flow zone, through which heat discharge fluid can flow through or around or both through and around, for discharging heat from the discharge heat transfer medium flow zone.

* * * * *